(12) United States Patent
Schwitters et al.

(10) Patent No.: US 6,253,573 B1
(45) Date of Patent: Jul. 3, 2001

(54) HIGH EFFICIENCY REFRIGERATION SYSTEM

(75) Inventors: Stephen W. Schwitters, Rockford, IL (US); Michael Meserole, Janesville, WI (US)

(73) Assignee: Specialty Equipment Companies, Inc., Aurora, IL (US)

( * ) Notice: Subject to any disclaimer, the term of this patent is extended or adjusted under 35 U.S.C. 154(b) by 0 days.

(21) Appl. No.: 09/265,689

(22) Filed: Mar. 10, 1999

(51) Int. Cl.$^7$ ....................................................... F25B 41/00
(52) U.S. Cl. ................................ 62/513; 62/340; 62/394; 165/155; 165/156
(58) Field of Search ............................ 62/340, 394, 513; 165/154, 155, 156

(56) References Cited

U.S. PATENT DOCUMENTS

| | | |
|---|---|---|
| 1,514,877 | 11/1924 | Suter . |
| 1,837,416 | 12/1931 | Ebinger . |
| 2,060,936 | * 11/1936 | Haag, Jr. .............................. 257/246 |
| 2,071,188 | * 2/1937 | White ...................................... 62/141 |
| 2,120,764 | 6/1938 | Newton . |
| 2,282,627 | * 5/1942 | Weiss ...................................... 62/141 |
| 2,364,130 | 12/1944 | Clancy . |
| 2,611,585 | 9/1952 | Boling . |
| 3,083,543 | * 4/1963 | Stanton ...................................... 62/3 |
| 3,402,562 | 9/1968 | Menzel . |
| 3,452,555 | 7/1969 | Thurman et al. . |
| 3,464,220 | 9/1969 | Phelan . |
| 3,475,922 | * 11/1969 | Scott et al. .............................. 62/394 |
| 3,479,839 | * 11/1969 | Scott ...................................... 62/394 |
| 3,486,489 | 12/1969 | Huggins . |
| 3,852,974 | 12/1974 | Brown . |
| 3,930,535 | 1/1976 | Menzel . |
| 3,952,538 | 4/1976 | Warlick . |
| 4,229,949 | 10/1980 | Brandin . |
| 4,284,133 | * 8/1981 | Gianni et al. .......................... 165/133 |
| 4,573,329 | 3/1986 | Cavalli . |
| 4,688,398 | 8/1987 | Baek . |
| 4,696,168 | 9/1987 | Woods et al. . |
| 4,718,250 | 1/1988 | Warren . |
| 4,758,097 | 7/1988 | Iles, Sr. . |
| 4,896,247 | 1/1990 | Cozer . |
| 4,991,407 | 2/1991 | Alvarez et al. . |
| 5,030,465 | 7/1991 | Curry et al. . |
| 5,386,709 | 2/1995 | Aaron . |
| 5,410,888 | 5/1995 | Kaiser et al. . |
| 5,419,150 | 5/1995 | Kaiser et al. . |

FOREIGN PATENT DOCUMENTS

| | | |
|---|---|---|
| 0 519 252 A1 | 12/1992 | (EP) . |
| 0 670 461 A1 | 9/1995 | (EP) . |
| WO 93/06424 | 4/1993 | (WO) . |

* cited by examiner

*Primary Examiner*—Corrine McDermott
*Assistant Examiner*—Marc Norman
(74) *Attorney, Agent, or Firm*—Foley & Lardner

(57) ABSTRACT

An improved evaporator for a refrigeration system to reduce the temperature of a medium therein in which a first tube composed of a first material having a first thermal conductivity is surrounded by a body of a second material disposed in intimate contact therewith, the second material having a different thermal conductivity than the thermal conductivity of the first material. An evaporator refrigerator inlet and outlet are disposed in the body and a refrigeration path intermediate the inlet and outlet includes a plurality of fins in the path to increase the surface area of the second material in the path. A refrigeration system using the improved evaporator and including a subcooler, is described and a method of manufacturing the evaporator is disclosed.

50 Claims, 7 Drawing Sheets

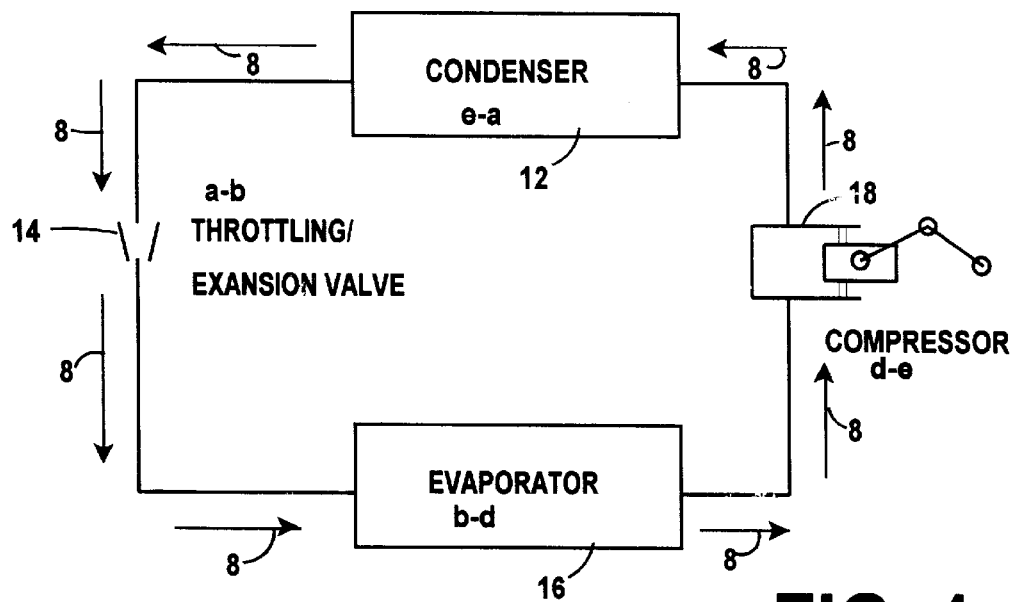
FIG. 1 (Background)
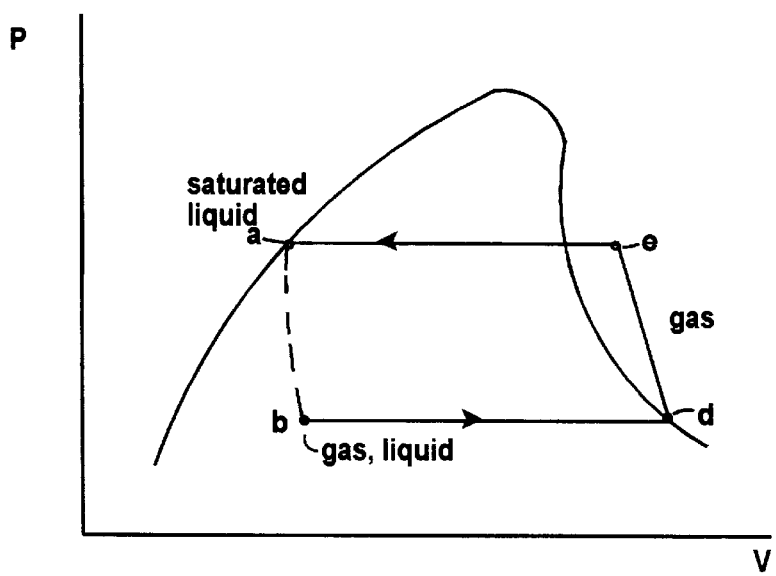
FIG. 2 (Background)

HIGH EFFICIENCY REFRIGERATION SYSTEM

BACKGROUND OF THE INVENTION

1. Field of the Invention

The present invention relates to refrigeration systems and more particularly relates to a high efficiency refrigeration system employing an improved evaporator design which may be utilized in conjunction with sub-coolers and the like, to form an improved system.

2. State of the Prior Art

By way of background, a refrigeration system uses a refrigeration cycle which is employed in refrigerators, heat pumps and air conditioners. The refrigerator becomes a heat pump when it is used to produce a heat flow into or out of a building. When it causes a heat flow out of the building it is then also called an air conditioner. As shown in the background diagram of FIG. 1, a refrigeration system 10 includes a condenser 12, a throttling or expansion valve 14, an evaporator 16 and a compressor 18. The refrigerant flows in either a gaseous or liquid state (sometimes a mixture of the two) by way of lines or piping, the direction of the flow being as indicated by the arrows 8. In the ideal refrigeration cycle, schematically illustrated in FIG. 2 the pressure (P) vs. volume (V) of refrigerant saturated liquid refrigerant passes through a throttling or expansion valve 14 and the liquid expands into a gas with some entrained liquid as shown at "b". The gas, with a mixture of liquid passes through the evaporator 16 which, in the case of a refrigerator, allows heat to be removed from food stuffs and the like and transferred to the gas, liquid mixture. As the gas picks up heat it expands and the volume increases. The gas is then compressed by the compressor 18 as illustrated in lines "d–e" in FIGS. 1 and 2, and then passed through a condenser 12 which gives off heat as the volume of the gas decreases and the pressure remains substantially constant. In the ideal refrigeration cycle, the compression from d to e is adiabatic and the gas increases in pressure with a decrease in volume. Moreover, because of the expansion through the throttling or expansion valve from a saturated liquid at "a" to a gas liquid mixture at "b", the process from "a" to "b" is also considered to be adiabatic. The coefficient of performance of an ideal refrigeration system is depicted as a heat flow in "b–d" (i.e., through the evaporator 16) relative to the work added by the compressor. Inasmuch as the work added by the compressor must equal (in an ideal system, excluding losses) the heat flow from states "e" minus the heat flow in "b–d", it is apparent that the coefficient of performance will increase by an increase in the heat flow in the portion of the cycle "b–d" relative to the amount of work added to the system by the compressor. Thus, for example, the more efficient the evaporator for the same amount of compressor work, the higher the coefficient of performance of the system.

With respect to freezing food stuffs in the evaporator, for example in the manufacture of ice cream, ice, non-dairy confectionery products, (hereinafter soft serve desserts) and the like it has been common practice to employ a scrapped surface heat exchanger constructed by surrounding a stainless steel cylinder with a refrigeration jacket. The refrigerant, in such a construction, is in direct contact with the stainless steel cylinder thereby cooling the surface of the cylinder such that the food stuff is quickly frozen and then scrapped off the inner freezing cylinder surface. The construction of this kind of refrigeration jacket is somewhat complex and involves a substantial amount of welding which includes internal baffles for directing the refrigeration flow.

A more common method of constructing the freezing cylinder is to wrap the stainless steel with copper tubing and route the refrigerant through the tubing to thereby transfer the heat from the freezing cylinder to the refrigerant through the tubing. For example, the Clancy patent, U.S. Pat. No. 2,364,130 illustrates as heat exchange apparatus with tubing in intimate contact with and spirally wound about a tubular shell or sleeve. One of the difficulties in this construction method is ensuring a good attachment of the copper tubing to the stainless steel in a manner which affects good heat transfer. Another attempt at improving the performance of the evaporation of the freezing cylinder is illustrated in U.S. Pat. No. 5,419,150 issued on May 30, 1995 to Kaiser, et al. who attempted to improve performance of the evaporator (freezer) by increasing the surface area on the interior of the evaporator by utilizing an additional inner refrigeration tube (See FIG. 12 of Kaiser).

Other means for increasing efficiency of heat exchangers are illustrated in the prior art such as Evinger, U.S. Pat. No. 1,837,416, wherein a heat exchanger is illustrated with a suitable length of helically wrapped metallic sheeting and an inner corrugated shell formed of such material as a copper or copper alloy. The Sutter patent U.S. Pat. No. 1,514,877, the Bowling patent U.S. Pat. No. 2,611,585 and the Huggins patent U.S. Pat. No. 3,486,489 all illustrate different constructions of heat exchangers. None of the prior art illustrates the invention as provided in the claims of this application. In U.S. Pat. No. 4,896,247 to Cozer, a cooling fluid flows through spiral passages around the inner chamber to draw heat from the contained vision system. Cozer recognizes that the spiral flow pattern enhances the cooling efficiency of the cooling system. However, Cozer does not recognize the need for increasing the surface area exposed to the refrigerant so as to enhance and maximize efficiency.

It has been discovered that the most important factor in heat exchange in this kind of evaporator is the transfer of heat from the evaporator itself to the refrigerant. By dramatically increasing the surface area to which the refrigerant is exposed, heat is removed faster and more efficiently from the freezing chamber to the refrigerant.

Of course there are other means to increase the efficiency of the evaporator so that it may be made more compact and more efficient while still allowing the passage there through of increased volumes of food stuffs such as soft serve desserts.

Sub-coolers in a refrigeration system are well known devices which are employed to evaporate low pressure liquid refrigerant which has not fully changed state to gas in the evaporator so that the liquid does not return to the compressor where it might cause damage. Typically, sub-coolers in a refrigeration system serve this purpose by providing a heat exchanger between the high pressure liquid refrigerant and the cold, low pressure suction line refrigerant gas. The condition which is inhibited is called refrigerant "flood back". Refrigeration systems such as an ice machine, which employ a defrost cycle, are typically fitted with sub-coolers.

It has been found that, in conjunction with the evaporator of the present invention, the addition of a sub-cooler allows full utilization of the evaporator heat transfer surface under a wide range of operating conditions. For example, without a sub-cooler it has been necessary to design the evaporator for about a 60% utilization under nominal conditions so that there is no excessive flood back during severe conditions. This margin of safety has been found, in the past, to necessitate a larger and more expensive evaporator with an increased volume of food stuffs (e.g., soft serve desserts) subject to product recall due to break down because of a longer holding time in a frozen state.

With respect to sub-coolers, such U.S. patents as Newton, U.S. Pat. No. 2,120,764; Brown U.S. Pat. No. 3,852,974; and Woods U.S. Pat. No. 4,696,168 all illustrate the advantages of a sub-cooler in a refrigeration system, i.e., to inhibit flood back. None of them illustrate the advantages of utilizing an evaporator of high efficiency construction such as shown and taught by the present invention.

SUMMARY OF THE INVENTION

In view of the above, it is a principle feature of the present invention to increase the efficiency of a refrigeration system by increasing the rate of heat transfer from the evaporator itself to the refrigerant.

Another feature of the present invention is the provision of a simple but effective way to dramatically increase the surface area to which the refrigerant is exposed so as to remove the heat efficiently from the food stuff or media having heat removed from it within the refrigeration chamber.

Yet another feature of the present invention is to allow for smaller more compact refrigeration chambers having the same media through put to be employed in a smaller space while increasing the efficiency of the entire refrigeration system.

Yet another feature of the present invention is to provide an evaporator design whose increased efficiency is such that it makes it capable of being employed with or without an efficiency raising sub-cooler, but which efficiency, allowing for a more compact design and full evaporator utilization may be obtained by using a sub-cooler.

To this end, the present invention provides for an improved evaporator for a refrigeration system for reducing the temperature of a medium therein. The evaporator comprises a tube having a thermally conductive interior surface. A refrigerant path is disposed externally of the tube but in contact therewith, and a plurality of fins are positioned in the path in conductive contact with the tube to thereby increase the surface area exposed to the refrigerant in the path.

In another embodiment of the invention, an improved evaporator for a refrigeration system for reducing the temperature of a medium therein is provided. The evaporator comprises a tube having an interior surface composed of a first material having a first thermal conductivity, a body or second tube, composed of a second material circumscribes the first material of the first tube and is disposed in intimate contact therewith at least along a portion of the first tube. The second material has a different thermal conductivity than the thermal conductivity of the first material. An evaporator refrigerant inlet and an evaporator refrigerant outlet are disposed in the second tube and a refrigerant path is disposed intermediate the inlet and outlet in the second material with a plurality of fins in the path thereby increasing the surface area of the second material in the path.

A refrigeration system is also provided utilizing an evaporator constructed in accordance with the present invention comprising a cylinder having an interior surface composed of a material of a first thermal conductivity, and a second tubular member circumscribing a first tubular member of the first material and in intimate conduct therewith. The second material of the second tubular member has a thermal conductivity preferably greater than the thermal conductivity of the first material. A path for the refrigerant is provided in the second material intermediate the refrigeration inlet and outlet of the evaporator, the path including a plurality of radially extending and projecting fins composed of the second material, the second material being in intimate contact with the first material. A seal circumscribes the second tube to seal the path to inhibit refrigerant escape to the exterior of the system except via the refrigerant inlet and outlet connecting the path. If desired, and in especially compact systems, a sub-cooler heat exchanger is provided intermediate the outlet of the condenser, and the inlet of the expansion valve to define a high pressure refrigerant path and a second low pressure refrigerant path intermediate the evaporator outlet and the compressor inlet and in heat exchange relationship with the high pressure refrigerant path to thereby increase the efficiency of the refrigeration system, and to allow for more compact designs of the evaporator.

BRIEF DESCRIPTION OF THE DRAWINGS

Other features, advantages, and objectives, and a more complete understanding of the invention may be had by reference to the following specification and claims taken in conjunction with the accompanying drawings in which:

FIG. 1 is a schematic drawing of a typical idealized, closed cycle refrigeration system;

FIG. 2 is a pressure volume diagram which indicates, for background purposes, the pressure volume relationship of an ideal refrigerant in the ideal refrigeration system shown in FIG. 1;

DETAILED DESCRIPTION OF THE PREFERRED EMBODIMENTS

Figure 3:
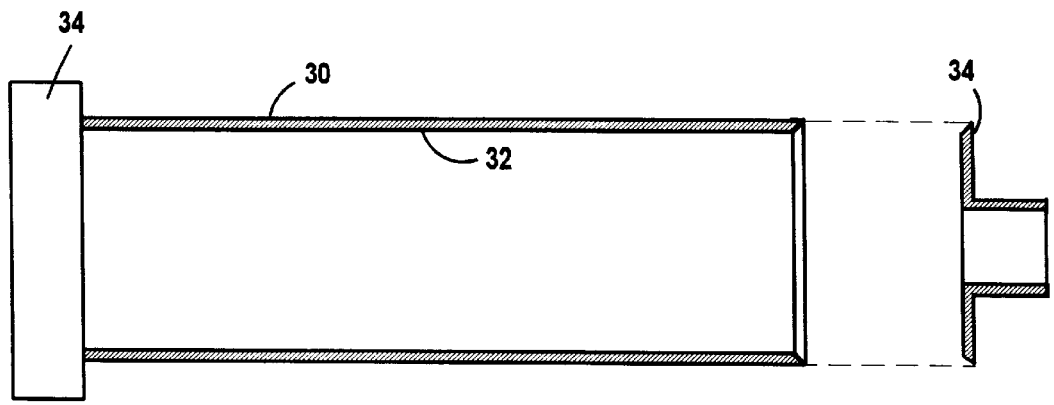
FIG. 3 is a fragmentary side elevational view illustrating the freezing chamber of an evaporator with parts removed, which may be employed as part of the apparatus of the present invention.
Figure 4:
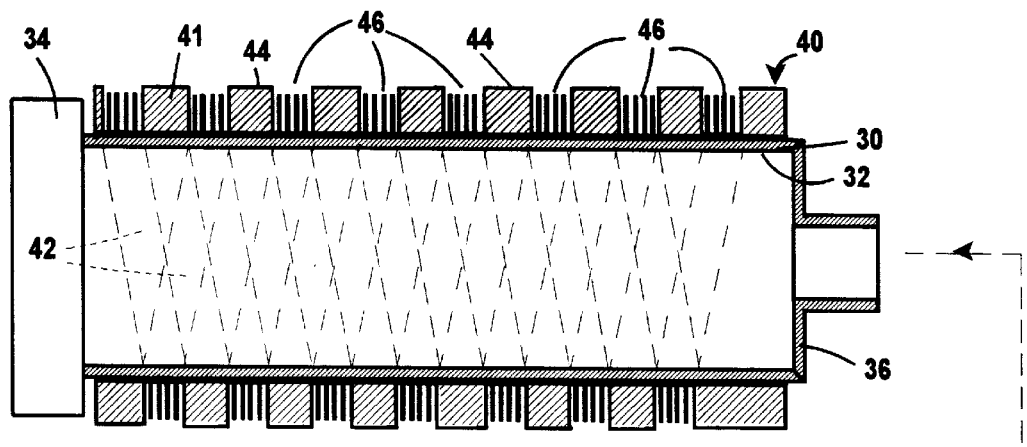
FIG. 4 illustrates the freezing chamber of FIG. 3 with a second material in position circumscribing the freezing tube and illustrating a circuitous or spiral refrigerant path in dashed lines so as not to obscure or otherwise detract from the view of the apparatus.
Figure 5:
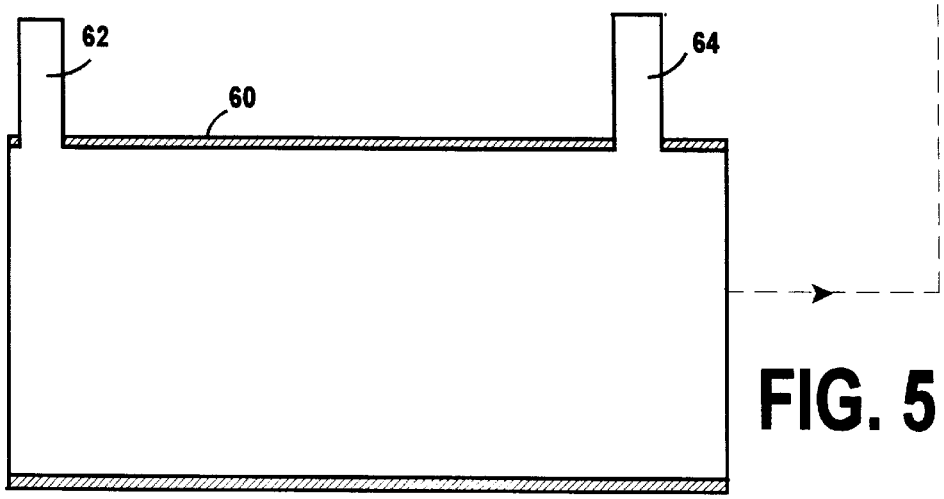
FIG. 5 is yet another tube removed from the exterior of the second tube and adapted for circumscribing the second tube to seal the refrigeration path from communication with the exterior of the system except via the refrigerant inlet and outlet of the path.

Turning now to the drawings, and especially FIGS. 3–6 thereof, the significant or improved portions of an evaporator constructed in accordance with the present invention are shown therein. The evaporator 20 (FIG. 6) comprises a first tube or freezing chamber 30 formed as a cylinder having an interior surface 32 and material or medium to be frozen inlet and outlet headers 34 and 36 respectively. At least the interior surface 32 of the tube 30 is composed of a first material having a first thermal conductivity. A second tube 40, also in the form of a cylinder, composed of a second material having a different thermal conductivity, in the preferred embodiment a greater thermal conductivity than the thermal conductivity of the first material, is disposed in intimate contact along at least a portion of the first tube 30. In the embodiment of the evaporator illustrated in FIG. 6, a sealing tube or cylinder 60 circumscribes and is an engagement with the outer surface 41 of the second tube 40 to thereby seal the second material and provide an inlet 62 and an outlet 64 for refrigerant, as hereinafter described.

In accordance with one feature of the invention, a refrigerant path 42 is provided intermediate the refrigerant inlet 62 and outlet 64 in the second tube 40. (The path 42 is shown in dashed lines). In the illustrated instance the refrigerant path 42 is circuitous or spiral and extends from the refrigerant inlet 62 to the outlet 64 of the sealing tube 60. In order to increase the efficiency of the heat conduction from the interior of the freezing chamber or first tube 30 to the tube 40 a plurality of fins 46 are disposed in the path 42. It should be recognized that the spiral path may be a very tight spiral but for purposes of illustration and clarification, portions of the second material of the second tube, such as a spiral spacer 44, is illustrated intermediate the adjacent ways of the path 42.

A typical material for composition of the first tube 30, or at least its interior surface 32, is stainless steel, which is preferred in the instance of utilization of the evaporator for freezing a medium or food stuff such as soft serve desserts in which the inner parts of the apparatus which are in contact with the medium must be capable of easy maintenance and assurance of a clean environment. Of course the material in the interior surface 32 may be composed of a plated material deposited upon the interior surface of the second material, and thereby forming a first tube or freezing chamber 30. Alternatively, the material may comprise a deposited layer of thermally conductive material disposed upon the interior surface of the second material thereby forming a tube or freezing chamber 30. However, in any freezing chamber design dealing with soft serve desserts and the like, the requirements of maintenance of cleanliness and formation of the chamber to facilitate the cleaning of the interior of the freezing chamber 30, is preferred.

The second tube 40 may be composed of a second material, having a different thermal conductivity, in the preferred embodiment a greater thermal conductivity than the thermal conductivity of the first material. A material such as aluminum which is easy to machine, facilitates the formation of the path 42 and simultaneous, if desired, manufacture of the fins 46. A milling machine may be employed for the cutting operation. If the first tube is separate, e.g., a stainless steel cylinder, the attachment of the second tube to the first tube may be facilitated in any convenient manner. For example, an interference fit may be utilized with the first tube 30 being cooled with the aluminum of the second tube being heated, the parts mated together and then allowed to cool.

It has also been found, however, that a reasonably good seal and attachment of the second tube 40 to the first tube 30 is available by ball swaging or hydroforming to affect radial expansion of the first tube or freezing chamber 30 against the second tube 40. This is accomplished by the medium discharge inlet section 36 being welded to the body of the tube 30 subsequent to the ball swaging operation. In ball swaging, a large diameter ball, larger than the interior diameter of the first tube 30, is forced through the first tube effecting radial displacement of the tube into and against the second tube 40. Of course the initial fit of the second tube 40 and the first tube 30, employing this method, should preferably be tight.

Another method of attaching the first tube 30 to the second tube 40 is allied to ball swaging, and is generally referred to as hydroforming. The first tube 30 is sealed and water or other liquid is employed within the sealed tube, and then pressurized to effect radial expansion of the first tube into sealing engagement with the second tube 40. Additional methods of effecting a seal between the first and second tubes 30 and 40 respectively, may be accomplished by electromagnetic forming. In this method, a coil is loosely positioned circumscribing the tubes 30 and 40, and a large current is pulsed through the coil. This pulse creates an electromagnetic field through the electrically conductive workpiece (e.g., aluminum) imparting sufficient kinetic energy to cause collapse of the second tube 40 onto the first tube 30. An example of the equipment which may be used for electro-magnetic forming is manufactured by Maxwell Magneform, 8224 Ronson Road, San Diego, Calif. 92111.

It should be recognized that the material of the second tube 40 may be composed of a material other than aluminum, for example copper. However, aluminum is less expensive than copper and exhibits similar qualities of heat transfer by conduction and refrigerant convection over the material.

After the sealing tube 60 is placed over the second tube 40, and in abutting, contiguous relationship therewith, it may be sealed or connected to the second tube as by a weld at 48 and 50, as may the discharge header 36 be joined to the first tube or freezing chamber 30 as by a weld as at 38.

Figure 7:
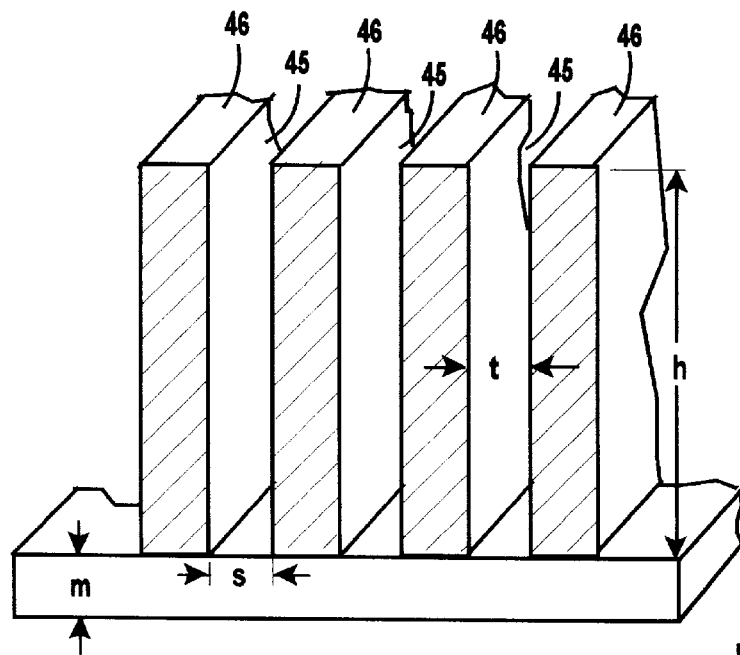
FIG. 7 is an enlarged fragmentary perspective view of the preferred form of fins utilized in the refrigerant path in accordance with the present invention.

It is believed that the enhanced efficiency of the evaporator 20 of the present invention is due to the increased surface area of the refrigerant against the fins as well as the conductive material which allows for heat conduction from the interior of the freezing chamber 30 through the walls of the first material to the second tube 40. A convenient form for the fins 46 is illustrated in FIG. 7, which illustrates an enlarged perspective view of four fins formed by a milling machine in the path 42 formed in the second tube 40. To this end, the milling machine forms slots or grooves 45 in the conductive material of the second tube 40, in the illustrated instance five such slots 45 may be cut forming four fins 46 intermediate the slots. To permit the reader to have a better idea of dimensions, in the example shown in FIG. 7, the height "h" of the fins is approximately ½ inch (12.7 millimeters) while the thickness "t" of the fins 46 is approximately ¹⁄₁₆ inch (1.6 millimeters), the slots width "s" also being ¹⁄₁₆ inch (1.6 millimeters) and the thickness "m" of the remaining material in abutting engagement against the first tube 30 is also ¹⁄₁₆". It should be understood however that these dimensions are only examples, and may be altered in accordance with, and under the theory that the more surface area exposed to the refrigerant, the higher the efficiency and the more heat conduction possible from freezing tube 30 to the fins and thus to the refrigerant.

Figure 8:
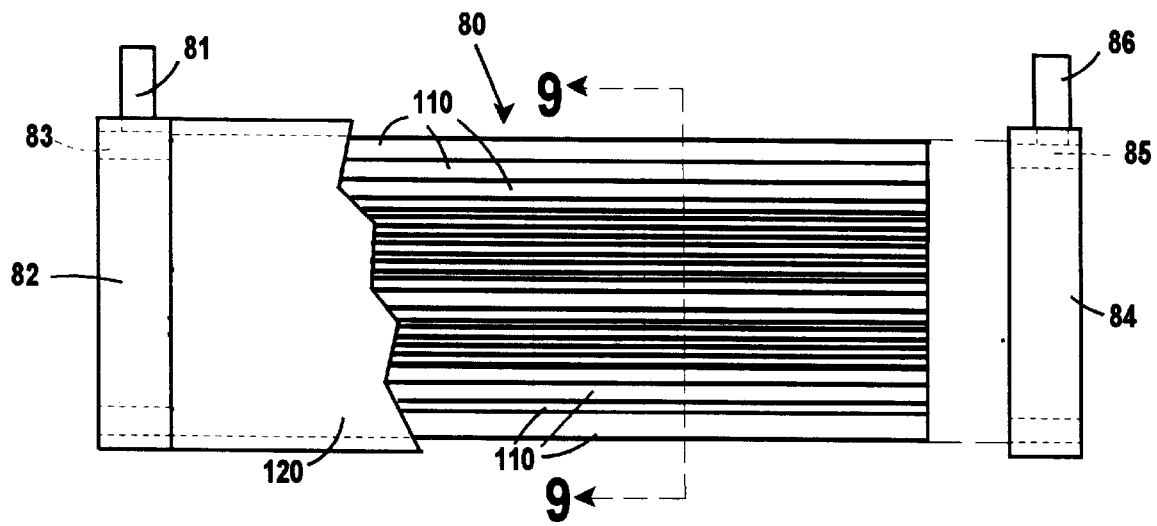
FIG. 8 is a fragmentary, side elevational view of another embodiment of an evaporator constructed in accordance with the present invention and in which the fins extend longitudinally and exteriorly of the freezing chamber.
Figure 9:
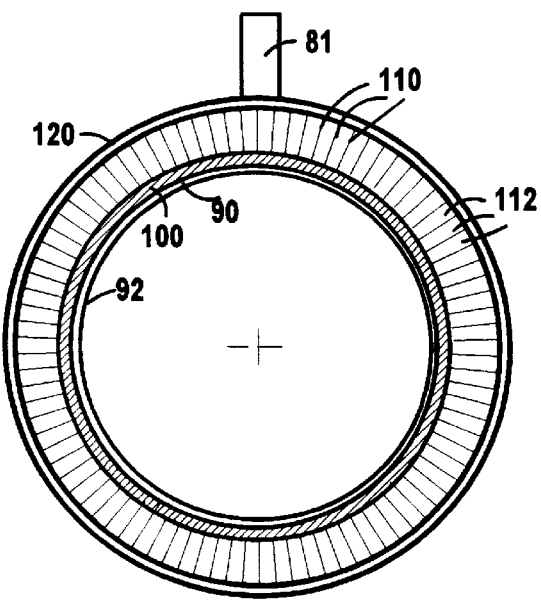
FIG. 9 is a schematic, enlarged fragmentary sectional view taken along lines 9—9 of FIG. 8.

Turning now to FIGS. 8 and 9, another embodiment of an evaporator 80, constructed in accordance with the present invention is illustrated therein. The evaporator 80, includes a medium and refrigerant inlet header 82 and, outlet header 84 abutting an interior tube or freezing chamber 90 with an interior surface 92. A second tube 100 composed of a material with a different heat conductivity than the material of the tube 90, circumscribes the first tube or freezing chamber formed interiorly of the first tube 90 and includes a plurality of spaced apart, radially projecting fins 110. In the illustrated instance the fins extend longitudinally of the second tube 100 and generally coaxially of the evaporator 80. Circumscribing the second tube is a sealing tube 120 which forms, in conjunction with the fins 110 and second tube base portion a refrigerant path 112 intermediate the fins 110 for the refrigerant. As illustrated the inlet and outlet headers each include an annular chamber 83 and 85 which allow entrance as through inlet pipe 81 and egress through outlet pipe 86 of the refrigerant into and out of the evaporator 80. It should be recognized that the fins 110 may be cut in the tube 100 of the second material so as to form a screw or spiral thread like path for the refrigerant. A spiral path formation, while increasing the surface area of the fins because of the increased length, is more complex to machine to form the fins, without a commensurate improvement in the heat transfer from the freezing chamber, i.e., the interior surface 92 of the first tube 90 and the refrigerant flow path 112 between the inlet 81 and outlet 86 of the refrigerant. In the embodiment illustrated in FIGS. 8 and 9, as before, the first material having a first conductivity may comprise a stainless steel or even include a thin layer of plated or deposited material upon the interior surface of the second material or second tube 100. The deposited first material, may of course, include heat conductive paint or other material which permits conduction from the freezing chamber and first tube 30 into the second material for refrigerant contact with the fins 110.

Figure 10:
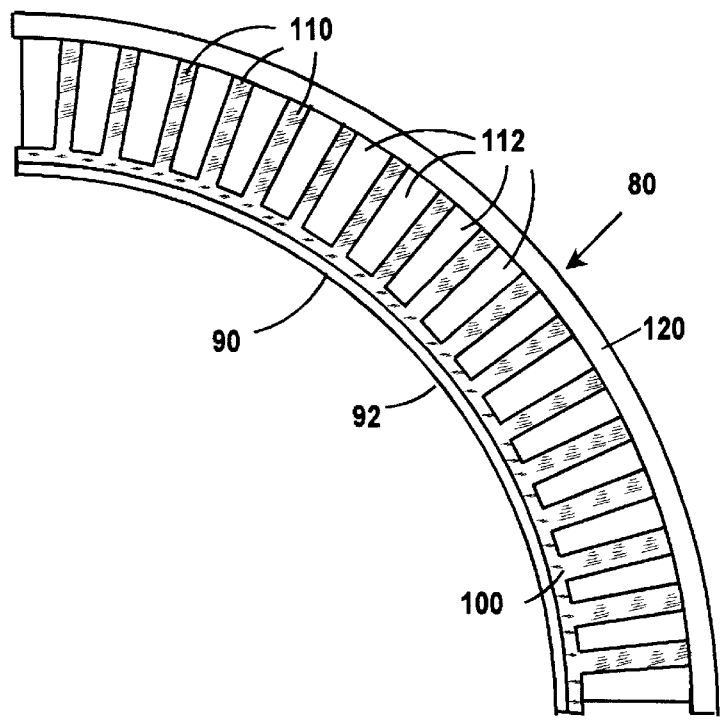
FIG. 10 is an enlarged end elevational view of a 90° segment of the sectional view of FIG. 9 with a first set of fins.

The fins 110 may be formed, as before, by a milling machine although their formation may be effected by extrusion. In FIG. 10, an enlarged quarter section of the evaporator 80 of FIG. 9 is illustrated wherein seventy-two fins 110 have been formed by cutting slots 112 at every 5 degrees, the fins and slots being interdigitated. The tube 120 may be joined in any convenient manner to the headers 82 and 84, as by continuous bead welding at its extended ends and spot welding to fins. To give some idea of dimensions, the first tube 90 is composed of a 0.025 inch (0.635 mm) thick stainless steel. The material of the second tube 100 from which the fins 110 have been formed being composed of an 1100 aluminum.

Figure 11:
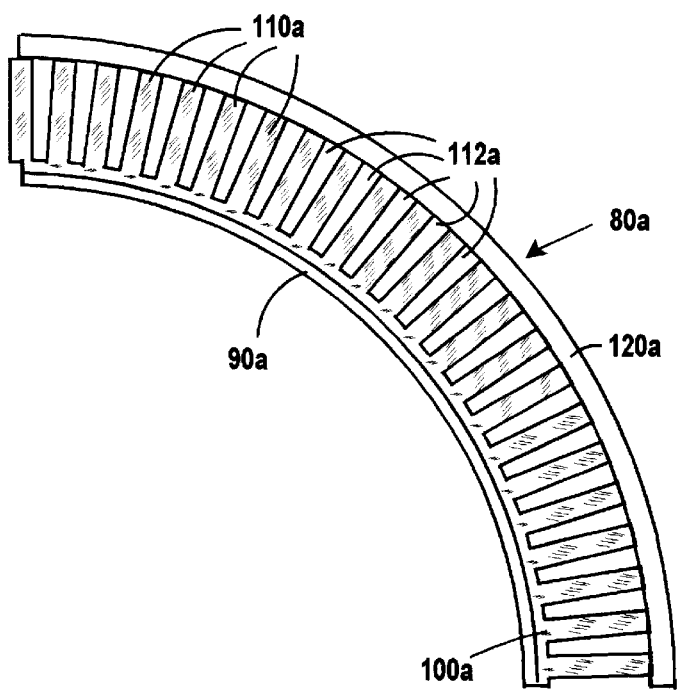
FIG. 11 is an enlarged end elevational view of a 90° segment of the sectional view of another embodiment similar to that shown in FIG. 10 with a second embodiment of fins to increase heat flow from the freezing chamber to the refrigerant.

In order to increase the heat transfer, from the freezing chamber to the refrigerant, it has been found that increasing the number of fins in the path of the refrigerant will effect greater heat transfer. To this end, and referring now to FIG. 11, a quarter section of an evaporator 80a is illustrated therein. In the embodiment illustrated in FIG. 11, an interior tube 90a, of for example 0.025 inch stainless steel, is joined to a second tube 100a of, for example, 1100 aluminum and includes ninety fins 110a formed once again by slots 112a intermediate the fins 110a. The advantages of the increased number of fins as to heat conductivity from the interior of the freezing chamber to the refrigerant will become more evident hereinafter. Suffice at this point, that the embodiment of FIG. 11 with ninety fins versus the embodiment of FIG. 10 with seventy-two fins, all other things being equal, will give an increase in heat exchange of 16.9%.

Figure 12:
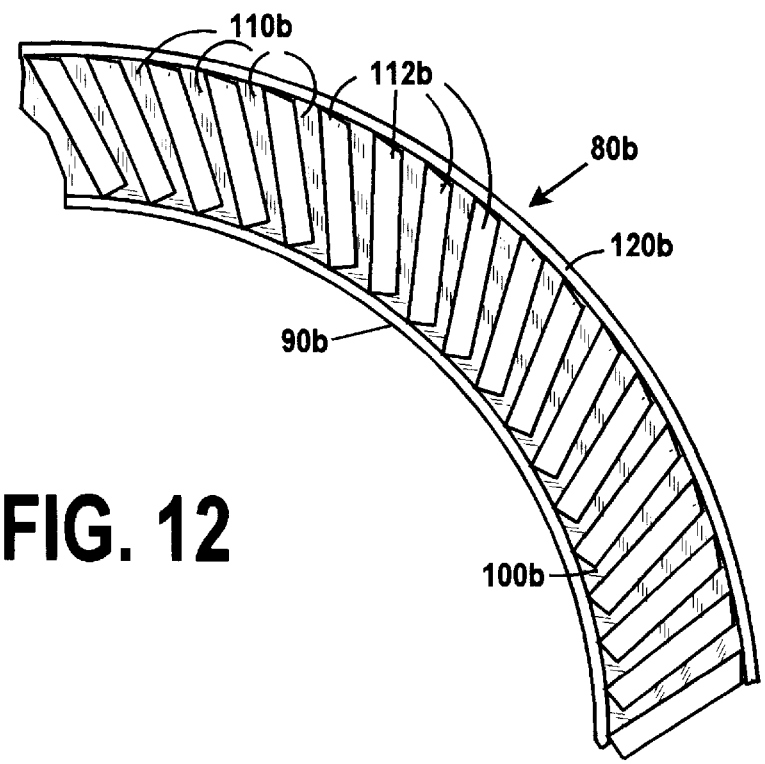
FIG. 12 is an enlarged end elevational view of a 90° segment of the sectional view with another fin embodiment to further increase the heat flow from the freezing chamber to the refrigerant.

Turning now to FIG. 12, a quarter section of another embodiment of an evaporator 80b, constructed in accordance with the present invention, is illustrated therein. As shown, a first tube 90b composed, for example of a first material such as stainless steel is joined in abutting, contiguous relation to a second tube of 100b in which fins 110b have been formed by cutting angle slots 112b in the second tube 100b. A sealing liner or outer tube 120b is joined so as to cover the slots 112b to thereby form a path or passageway for the refrigerant material through the slots. In this embodiment, seventy-two fins have been formed by milling the slots 112b at an angle in the tube 10b, thereby increasing the length of the fins 110b. As will become clear hereinafter, the embodiment of FIG. 12 increases the heat conductivity from the freezing chamber through the stainless steel over the seventy-two fins embodiment illustrated in FIG. 10, but slightly less than the heat conductivity of the embodiment illustrated in FIG. 11.

Figure 13:
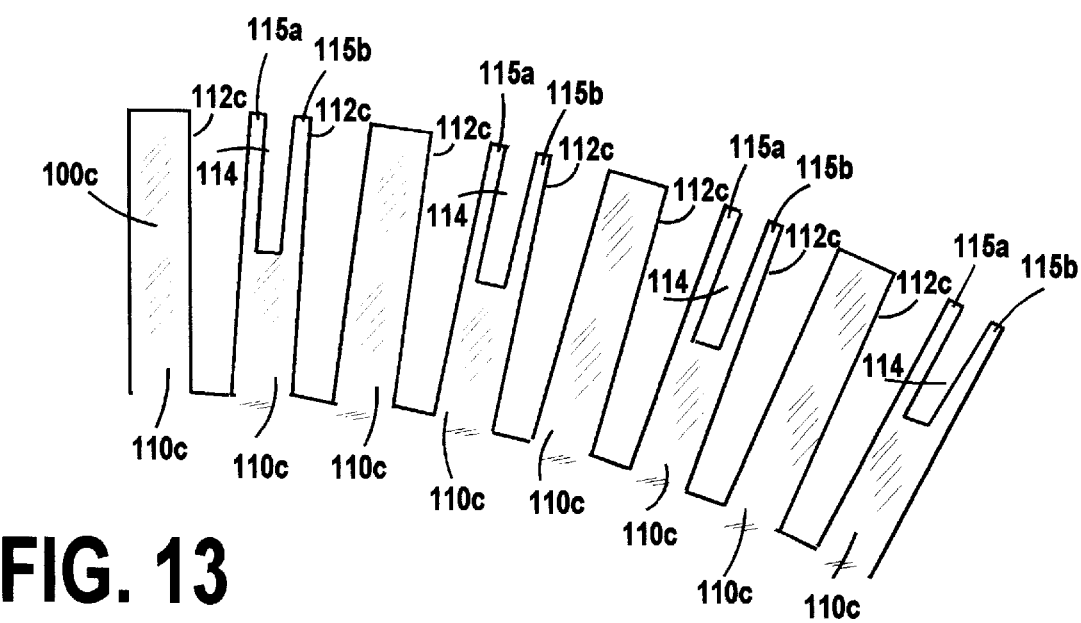
FIG. 13 is yet another fin configuration for the evaporator of the present invention which exhibits a further enhancement in heat transfer efficiency.

Turning now to FIG. 13, an expanded formation of fins 110c and adjacent slots 112c cut so as to form ninety fins plus forty-five short or subfins is shown. In the illustrated embodiment of FIG. 13, only a portion of the second tube 100c is illustrated, each of the body of the fins 110c being formed by cutting slots 112c, in the illustrated instance at an angle in the material (e.g., aluminum) of the tube 100c. Thus the number of fins is increased in FIG. 13 over that illustrated in FIG. 12 from seventy-two to ninety. Moreover, in order to increase the surface area of the fins, alternate or interdigitated fins were cut with a quarter inch deep slot such as at 114 to form an extra forty-five fins 115a, 115b in alternate interdigitated ones of the fins 110c. As discussed below, this increases the heat transfer flow by a measured amount.

In order to illustrate the differences in heat conductivity of the various embodiments shown in FIGS. 8–13, a stainless steel cylinder (0.025 inches thick) was swaged to a 6061 aluminum cylinder with twenty-four holes or apertures therein of approximately ½ inch in diameter extending longitudinally or coaxially of the second material or tube. (not shown) The material to be frozen and kept at a cold temperature of 8° F. was soft serve desserts and the evaporator temperature was kept at a −12° F. With a structure otherwise the same, the heat transfer flow from the interior of the freezing chamber to the refrigerant was 2,263 BTU's per hour (663 watts).

In the embodiment shown in FIG. 10, i.e., seventy-two fins with half inch deep slots therebetween, in an 1100 aluminum, with 0.025 inch stainless liner, once again with the soft serve desserts kept at 8° F. and the evaporator temperature kept at −12° F., the heat transfer rate was 5,842 BTU's/hr. (1712 watts) while in the ninety fins embodiment of FIG. 11, the increase in heat transfer, all other conditions being equal, was 6830 BTU's/hr. (2002 watts). In the embodiment illustrated in FIG. 12 with an angular fin formation opposed to the seventy-two fin embodiment of FIG. 10, the heat transfer was 6400 BTU's/hr. (1876 watts)

which illustrates an increase over the perpendicular fins of FIG. 10 but not as great an increase in the heat transfer capabilities as compared to the ninety fins embodiment.

However, in the ninety fins embodiment with forty-five smaller fins being formed on interdigitated or intermediate fins, the heat transfer rate jumped to 7,875 BTU's/hr. (2308 watts) once again showing an increase in the efficiency of the heat transfer because of the increase in surface area over the surface area of the ninety fin embodiment of FIG. 11.

All heat transfer figures were calculated from a finite element program running on a personal computer. The finite element program "TERA", was from Tera Analysis Company located at 17114 Bircher Street, Grenada Hills, Calif. 91344.

Figure 6:
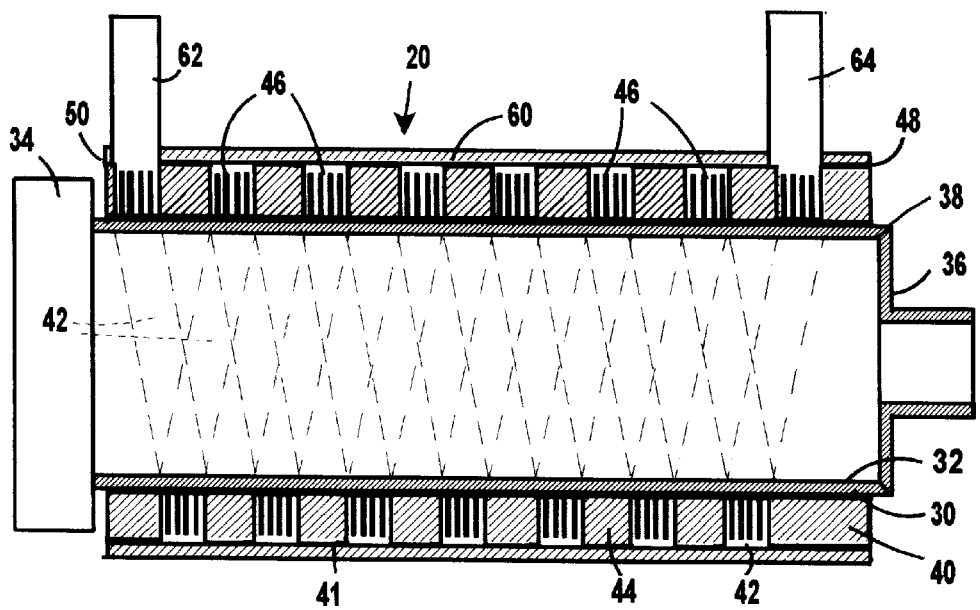
FIG. 6 is a fragmentary sectional view in side elevation illustrating the sealing tube of FIG. 5 superimposed relation to the apparatus of FIG. 4 and in position to form an embodiment of the evaporator of the present invention.
Figure 14:
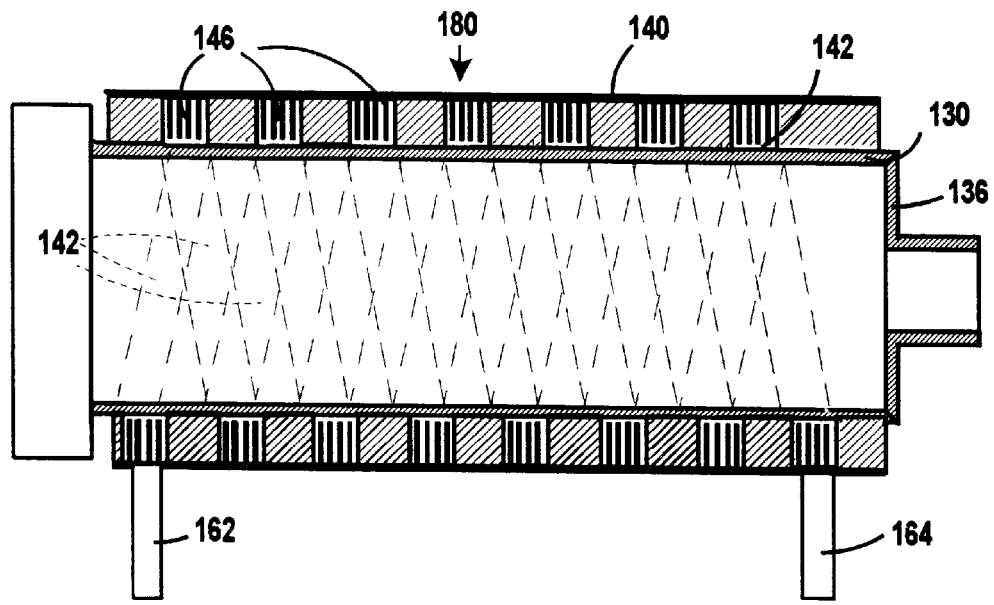
FIG. 14 is yet another embodiment of the evaporator of the present invention, similar to the embodiment shown in FIG. 6 and yet without the sealing tube of FIG. 5.

Turning now to FIG. 14, an embodiment of an evaporator 180, similar to the embodiment of the evaporator 20 illustrated in FIG. 6 is shown therein. However, in the embodiment of FIG. 14, the inner tube, sleeve or cylinder 130 forming a freezing chamber and the like includes a second tube or cylinder 140 composed of a second material having a different thermal conductivity, in the preferred embodiment a greater thermal conductivity than the thermal conductivity of the first material which forms the tube 130. The second tube is disposed in circumferential, abutting relationship or intimate contact along at least a portion of the first tube 130. In the embodiment of the evaporator illustrated in FIG. 6 a sealing tube was utilized to circumscribe and lie in engagement with the outer surface of the second tube, but herein, and as illustrated in FIG. 14, the second tube 140 merely has an interior path 142 for the refrigerant flowing from the refrigerant inlet 162 to refrigerant outlet 164. Similar to the embodiment illustrated in FIG. 6, a medium to be frozen inlet header 134 is disposed at one end of the tube 130 while a medium outlet header 136 is disposed at its opposite end. Moreover, the path 142 for the refrigerant, by being cut on the interior of the tube 140 in lieu of the exterior provides a simple advantage of not requiring a sealing tube. However, suspending the fins 146 in the path 142 as opposed to having their bases in conductive contact with the stainless steel cylinder does require a longer conduction path for heat flow and therefore some loss of efficiency is incurred by causing the fins to be suspended in the path rather than projecting outwardly from the base or stainless steel cylinder 130. Once again, the second tube 140 may be composed of either an aluminum or a copper for easy machinability or extrusion.

Figure 15:
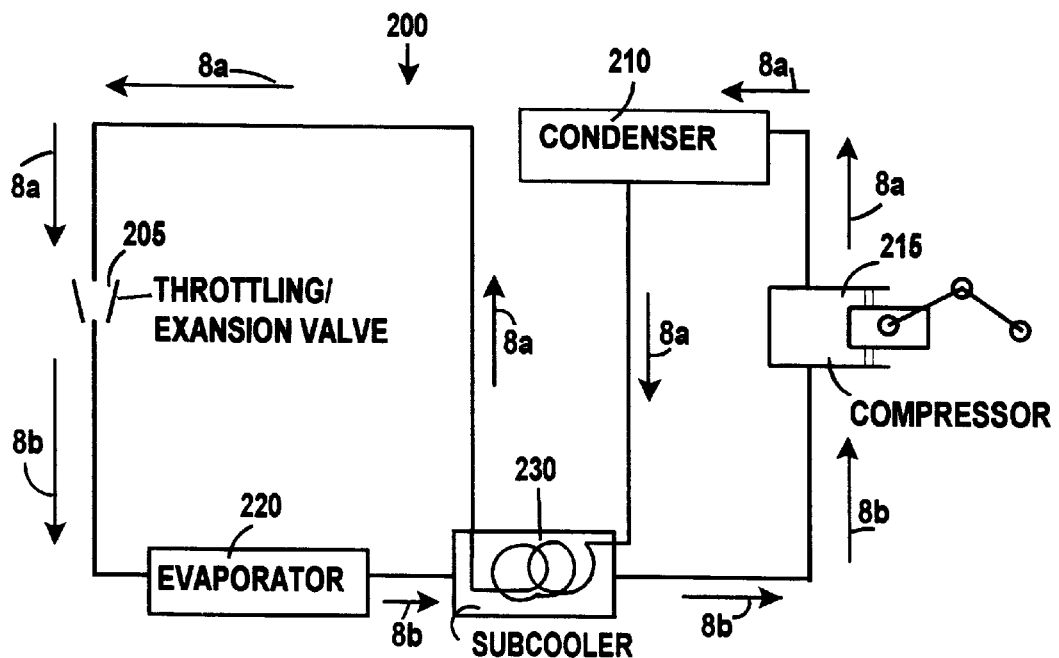
FIG. 15 is a schematic diagram of an improved refrigeration system employing the evaporator of the present invention with a sub-cooler to further enhance the efficiency of the system.

Turning now to FIG. 15, an additional increase in a refrigeration system efficiency, such as in refrigeration system 200 illustrated in FIG. 15, may occur by utilizing any of the improved evaporators 220 heretofore described. In the embodiment of FIG. 15, and especially where a compact, small size evaporator is to be employed, a subcooler heat exchanger 230 is provided intermediate the outlet of the condenser 210 and the inlet of the throttling expansion valve 205. As illustrated this defines a high pressure refrigerant path (from the compressor 215 through the condenser 210, through the subcooler 230 and then to the throttling expansion valve 205) and a second low pressure refrigerant path (defined as from the evaporator 220 inlet through the subcooler 230 and to the suction side of the compressor 215) the low pressure and high pressure refrigerant paths in heat exchange relation to thereby increase the efficiency of the refrigeration system and allow for more compact evaporator design.

The table below illustrates the temperatures and, in some instances the composition of the refrigerant. In FIG. 15, the high pressure side of the refrigerant path through the condenser 210, subcooler 230, and to the throttling expansion valve 205 is indicated by the arrows designated 8a. Of course the various parts of the refrigeration system are interconnected as by tubing or conduits of suitable material for carrying a refrigerant. Alternatively, the arrows designated 8b illustrate the low pressure gas/liquid portion of the refrigeration cycle. In the table below, temperatures of the gas/liquid with and without a subcooler are illustrated. It is noted that without a subcooler it is necessary to design a typical evaporator, even one constructed in accordance with the present invention, for about a sixty percent utilization under nominal conditions so that there is no excessive floodback during severe conditions. Alternatively, with a subcooler, the freezing chamber may be reduced in size, thus reducing the overall size of the machine while maintaining the same medium to be frozen throughput of the machine.

|  | Reference System W/O Subcooler (FIG. 1) | Reference System W/ Subcooler (FIG. 15) |
|---|---|---|
| Temperature @ |  |  |
| Condenser Outlet | 90° F. | 90° F. |
| Expansion Valve Inlet | 80° F. | 10° F. |
| Evaporator Inlet | −15° F.[1] | −15° F.[2] |
| Evaporator Outlet | −15° F. | −15° F. |
| Compressor Inlet | −15° to 60° F.[3] | 0° to 10° F.[4] |

[1] 99% gas, 1% liquid by volume
[2] 92% gas, 8% liquid by volume
[3] gas/liquid mixture
[4] Low Pressure gas Greater liquid content improves heat transfer coefficient throughout the length of the evaporator. With the subcooler, a significant amount of liquid refrigerant can be allowed to exit the outlet where its cooling will be used in the subcooler to cool more incoming liquid.

Thus an increased efficiency evaporator design as well as an increased efficiency refrigeration system has been illustrated. Moreover, the evaporator design is such that it is capable of being employed with or without an efficiency raising subcooler, the latter increasing efficiency by allowing for a more compact design and full evaporator utilization.

While the invention has been described with particular detail, it is clear that other embodiments may readily be suggested to persons skilled in the art of refrigeration systems, its component parts and design.

Moreover, while the embodiments illustrated in the various drawings described above are presently preferred, it should be understood that those embodiments are offered by way of example only. The invention is not intended to be limited to any particular embodiment but is intended to extend to various modifications that nevertheless fall within the scope of the appended claims.

What is claimed is:

1. An evaporator for a refrigeration system for reducing the temperature of a medium therein, said evaporator comprising:

a first tube having an interior surface composed of a first material having a first thermal conductivity;

a medium inlet and outlet associated with said first tube;

a body composed of a second material circumscribing said first tube and disposed in intimate contact along at least a portion of said first tube, said second material having a greater thermal conductivity than the thermal conductivity of said first material;

an evaporator refrigerant inlet and an evaporator refrigerant outlet in said body;

a confined refrigerant path intermediate said inlet and outlet, and a plurality of fins in said path thereby increasing the surface area of the second material in the confined path.

2. An evaporator for a refrigeration system in accordance with claim 1, wherein said path intermediate said inlet and outlet in said second material comprises a circuitous refrigerant route in said second material from said inlet to said outlet.

3. An evaporator for a refrigeration system in accordance with claim 2, wherein said path intermediate said refrigerant inlet and outlet in said second material comprises a spiral extending axially and circumferentially of said first mentioned tube.

4. An evaporator for a refrigeration system in accordance with claim 1, wherein said body and the first tube are cylinders, and wherein the path extending between said inlet and outlet is longitudinally extending of said second cylinder of said second material and formed therein, and whereby said fins extend radially and coaxially of said cylinder.

5. An evaporator for a refrigeration system in accordance with claim 4, including a tube circumscribing and in engagement with said second material to thereby seal the refrigerant path in the second material.

6. An evaporator for a refrigeration system in accordance with claim 1, wherein said path intermediate said refrigerant inlet and outlet in said second material comprises a spiral extending axially and circumferentially of said first mentioned tube.

7. An evaporator for a refrigeration system in accordance with claim 1, wherein said first and second tubes are cylinders, and wherein the path extending between said inlet and outlet is longitudinally extending of said second cylinder of said second material and formed therein, and whereby said fins extend radially and coaxially of said cylinder.

8. An evaporator for a refrigeration system in accordance with claim 7, including a tube circumscribing and in engagement with said second material to thereby seal the refrigerant path in the second material.

9. An evaporator for a refrigeration system in accordance with claim 1, wherein said first material having a first conductivity comprises a cylinder of stainless steel.

10. An evaporator for a refrigeration system in accordance with claim 1, wherein said first material comprises a thin layer of heat conductive material disposed upon the interior surface of said second material, thereby forming a cylinder of conductive material in mating engagement with said second tube.

11. An evaporator for a refrigeration system in accordance with claim 1, wherein said first material comprises a thin layer of plated metal disposed upon the interior surface of said second material, thereby forming a cylinder of plated metal.

12. An evaporator for a refrigeration system in accordance with claim 1, wherein said first material comprises a deposited layer of thermally conductive material disposed upon the interior surface of said second material.

13. An evaporator for a refrigeration system in accordance with claim 12, wherein said second material comprises aluminum.

14. An evaporator for a refrigeration system in accordance with claim 12, wherein said second material comprises copper.

15. An evaporator for a refrigeration system in accordance with claim 1, including a tube circumscribing and in engagement with said second material to thereby seal the refrigerant path in the second material.

16. An evaporator for a refrigeration system in accordance with claim 1, wherein said fins are disposed at an angle in said path to thereby increase the surface area of the fins in said path.

17. A method of constructing an evaporator for a refrigeration system for reducing the temperature of a medium therein comprising;

forming a first tube of a first material having a first thermal conductivity;

providing a medium inlet and outlet associated with said first tube;

forming a body composed of a second material circumscribing said first tube, at least a portion of which is disposed in intimate mating contact with said first tube;

forming a confined refrigerant path in said body, and disposing in said path a plurality of fins composed of said second material to increase the surface area of the second material in said confined refrigerant path.

18. A method of constructing an evaporator for a refrigeration system in accordance with claim 17, including the step of:

forming said fins and said path by milling the path in the exterior of the second tube, and milling spaced apart slots to thereby form said fins therebetween.

19. A method of constructing an evaporator for a refrigeration system in accordance with claim 18, including the step of milling slots at an angle to thereby increase the surface area of the fins.

20. A method of constructing an evaporator for a refrigeration system in accordance with claim 17, including the step of forming subfins in at least some of said fins to thereby further increase the surface area of said fins.

21. A method of constructing an evaporator for a refrigeration system in accordance with claim 17, including the step of:

forming said fins and said path by milling the path in the interior of the second tube, and milling spaced apart slots to thereby form said fins therebetween.

22. A method of constructing an evaporator for a refrigeration system in accordance with claim 17, including the step of extruding said second tube to thereby form the path and fins.

23. A method of constructing an evaporator for a refrigeration system in accordance with claim 17, including the step of:

radially deforming said first tube against the interior of said second tube to thereby force an intimate contact between said first and second tubes.

24. A method of constructing an evaporator for a refrigeration system in accordance with claim 17, including the step of:

forming an outer tube and positioning said outer tube in superimposed, overlapping relation with respect to said body to thereby circumferentially seal the pathway in said body.

25. A refrigeration system comprising a compressor having a refrigerant inlet and outlet, a condenser having a refrigerant inlet and outlet, and means defining a refrigerant carrying conduit between said outlet of said compressor and an inlet of said condenser, and an evaporator having a refrigerant inlet and outlet and a second refrigerant carrying conduit intermediate the outlet of said condenser and the inlet of said evaporator, an expansion valve intermediate said condenser outlet and said evaporator inlet in said second conduit, and third refrigerant conduit means extending from said outlet of said evaporator to the inlet of said compressor thereby forming a closed refrigeration system;

said evaporator comprising a tubular cylinder having an interior surface composed of a material of a first thermal conductivity, and a body of a second material circumscribing said first tubular cylinder of said first material, at least a portion of said body being in intimate mating contact therewith, said second material having a thermal conductivity greater than said thermal conductivity of said first material;

and a path in said second material intermediate said refrigerant inlet and outlet of said evaporator, and a seal for said path to confine refrigerant to said path in said second material, said path including a plurality of radially extending and projecting fins of said second material in intimate contact with said second material.

26. A refrigeration system in accordance with claim 25, including a subcooler heat exchanger in the conduit means intermediate the outlet of the condenser and inlet of the expansion valve to define a high pressure refrigerant path; and a second low pressure refrigerant path intermediate the evaporator outlet and the compressor inlet, through the subcooler and in heat exchange relationship therein with the high pressure refrigerant path.

27. An evaporator for a refrigeration system, said refrigeration system including a compressor having a refrigeration medium inlet and an outlet, an evaporator having a refrigeration inlet and outlet, a condenser having refrigeration medium inlets and outlets and a refrigerant line leading from the outlet of the compressor to the inlet of the condenser and from the outlet of the condenser to the inlet of the evaporator, an expansion valve intermediate the evaporator and the condenser in the refrigerant line, and a refrigerant line intermediate the evaporator outlet and the compressor inlet, said evaporator comprising:

a cylinder having an interior cylindrical surface composed of a first material having a first conductivity;

a second cylinder circumscribing said first material and forming a body about said first cylinder and composed of a second material having a thermal conductivity greater than the conductivity of said first material; and a sealed and confined refrigerant path extending through said second material with means to effect an increase in the surface area of said second material exposed to refrigerant flowing in said path.

28. An evaporator for a refrigeration system in accordance with claim 27, wherein said path intermediate said inlet and outlet in said second material comprises a circuitous refrigerant route in said second material from said inlet to said outlet.

29. An evaporator for a refrigeration system in accordance with claim 28, wherein said circuitous path intermediate said inlet and outlet in said second material comprises a spiral path in said second material from said inlet to said outlet.

30. An evaporator for a refrigeration system in accordance with claim 27, wherein the path extending between said inlet and outlet is longitudinally extending of said cylinder of said second material and whereby said means to increase the surface area of said second material are fins which extend radially and coaxially of said cylinder.

31. An evaporator for a refrigeration system in accordance with claim 27, wherein said first material having a first conductivity comprises stainless steel.

32. An evaporator for a refrigeration system in accordance with claim 27, wherein said first material comprises a thin layer of plated metal disposed upon the interior surface of said second material.

33. An evaporator for a refrigeration system in accordance with claim 27, wherein said second material comprises aluminum.

34. An evaporator for a refrigeration system in accordance with claim 27, wherein said second material comprises copper.

35. An evaporator for a refrigeration system in accordance with claim 27, wherein said first material comprises a deposited layer of conductive material disposed upon the interior surface of said second material.

36. An evaporator for a refrigeration system in accordance with claim 27, including a sleeve circumscribing said body to thereby seal and confine the refrigerant path in said second material.

37. An evaporator for a refrigeration system, said refrigeration system including a compressor having a refrigeration medium inlet and an outlet, an evaporator having a refrigeration inlet and outlet, a condenser having refrigeration medium inlets and outlets and a refrigerant line leading from the outlet of the compressor to the inlet of the condenser and from the outlet of the condenser to the inlet of the evaporator, an expansion valve intermediate the evaporator and the condenser in the refrigerant line, and a refrigerant line intermediate the evaporator outlet and the compressor inlet, said evaporator comprising:

a cylinder having an interior cylindrical surface composed of a first material having a first conductivity;

a second material circumscribing said first material and forming a body about said first cylinder and composed of a second material having a thermal conductivity greater than the conductivity of said first material;

a refrigerant path extending through said second material with means to effect an increase in the surface area of said second material exposed to said refrigerant in said path, and wherein said first material comprises a deposited layer of conductive material disposed upon the interior surface of said second material.

38. In a freezing chamber for a refrigeration system for reducing the temperature of a medium such as soft serve dessert and the like therein, said freezing chamber including an improved evaporator comprising:

a thermally conductive tube having an interior surface in which a medium is placed for achieving a temperature reduction;

a medium inlet and outlet associated with said tube;

a refrigerant path defined externally of said tube but in contact therewith, and a plurality of fins in said path in conductive contact with said tube to increase the surface area exposed to the refrigerant in the path; and a second tube circumscribing said first tube and disposed in intimate contact along at least a portion of said first tube, said second tube including said refrigerant path and said fins.

39. An evaporator for a refrigeration system for reducing the temperature of a medium therein, said evaporator comprising:

a first tubular cylinder having an interior surface composed of a first material having a first thermal conductivity;

a medium inlet and outlet associated with said first tubular cylinder;

a body comprised of a second tubular cylinder composed of a second material circumscribing said first tubular cylinder and disposed in intimate contact along at least a portion of said first tubular cylinder, said second material having a different thermal conductivity than the thermal conductivity of said first material;

an evaporator refrigerant inlet and an evaporator refrigerant outlet in said body;

a longitudinally extending refrigerant path intermediate said inlet and outlet in said second tubular cylinder, and a plurality of fins radially and coaxially extending in said path thereby increasing the surface area of the second material in the path.

40. An evaporator for a refrigeration system in accordance with claim 39, wherein the thermal conductivity of said second material is greater than the thermal conductivity of the first material.

41. An evaporator for a refrigeration system in accordance with claim 40, including a tube circumscribing and in engagement with said second material to thereby confine the refrigerant path in the second material.

42. An evaporator for a refrigeration system in accordance with claim 39, including a tube circumscribing and in engagement with said second material to thereby seal the refrigerant path in the second material.

43. An evaporator for a refrigeration system for reducing the temperature of a medium therein, said evaporator comprising:

a first tube having an interior surface composed of a first material having a first thermal conductivity;

a medium inlet and outlet associated with said first tube;

a body composed of a second material circumscribing said first tube and disposed in intimate contact along at least a portion of said first tube, said second material having a different thermal conductivity than the thermal conductivity of said first material; said first material comprising a layer of heat conductive material disposed upon the interior surface of said second material, thereby forming a cylinder of conductive material in mating engagement with said second tube;

an evaporator refrigerant inlet and an evaporator refrigerant outlet in said body;

a refrigerant path intermediate said inlet and outlet, and a plurality of fins in said path thereby increasing the surface area of the second material in the path.

44. An evaporator for a refrigeration system in accordance with claim 43, wherein said first material comprises a thin layer of plated metal disposed upon the interior surface of said second material, thereby forming a cylinder of plated metal.

45. An evaporator for a refrigeration system in accordance with claim 43, wherein said first material comprises a deposited layer of thermally conductive material disposed upon the interior surface of said second material.

46. An evaporator for a refrigeration system for reducing the temperature of a medium therein, said evaporator comprising:

a first tube having an interior surface composed of a first material having a first thermal conductivity;

a medium inlet and outlet associated with said first tube;

a body composed of a second material circumscribing said first tube and disposed in intimate contact along at least a portion of said first tube, said second material having a different thermal conductivity than the thermal conductivity of said first material;

an evaporator refrigerant inlet and an evaporator refrigerant outlet in said body;

a refrigerant path intermediate said inlet and outlet, and a plurality of fins disposed at an angle in said path thereby increasing the surface area of the second material in the path.

47. A method of constructing an evaporator for a refrigeration system for reducing the temperature of a medium therein comprising;

forming a first tube of a first material having a first thermal conductivity;

providing a medium inlet and outlet associated with said first tube;

forming a body composed of a second material circumscribing said first tube, at least a portion of which is disposed in intimate mating contact with said first tube;

forming a refrigerant path in said second material, and a plurality of fins composed of said second material to increase the surface area of the second material in said refrigerant path;

forming said fins and said path by milling in the exterior of the second material; and milling spaced apart angulated slots to thereby form said fins therebetween.

48. A method of constructing an evaporator for a refrigeration system for reducing the temperature of a medium therein comprising;

forming a first tube of a first material having a first thermal conductivity;

providing a medium inlet and outlet associated with said first tube;

forming a body composed of a second material circumscribing said first tube, at least a portion of which is disposed in intimate mating contact with said first tube;

forming a refrigerant path in said body, and disposing in said path a plurality of fins composed of said second material to increase the surface area of the second material in said refrigerant path;

forming an outer tube and positioning said outer tube in superimposed, overlapping relation with respect to said body to thereby circumferentially seal the pathway in said body.

49. An evaporator for a refrigeration system, said refrigeration system including a compressor having a refrigeration medium inlet and an outlet, an evaporator having a refrigeration inlet and outlet, a condenser having refrigeration medium inlets and outlets and a refrigerant line leading from the outlet of the compressor to the inlet of the condenser and from the outlet of the condenser to the inlet of the evaporator, an expansion valve intermediate the evaporator and the condenser in the refrigerant line, and a refrigerant line intermediate the evaporator outlet and the compressor inlet, said evaporator comprising:

a cylinder having an interior cylindrical surface composed of a first material having a first conductivity;

a second material circumscribing said first material and forming a body about said first cylinder and composed of a second material having a thermal conductivity greater than the conductivity of said first material; and a refrigerant path extending longitudinally of said cylinder and through said second material with fins which extend radially and coaxially of said cylinder to effect an increase in the surface area of said second material exposed to said refrigerant in said path.

50. An evaporator for a refrigeration system, said refrigeration system including a compressor having a refrigeration medium inlet and an outlet, an evaporator having a refrigeration inlet and outlet, a condenser having refrigeration medium inlets and outlets and a refrigerant line leading from the outlet of the compressor to the inlet of the condenser and from the outlet of the condenser to the inlet of the evaporator, an expansion valve intermediate the evaporator and the condenser in the refrigerant line, and a refrigerant line intermediate the evaporator outlet and the compressor inlet, said evaporator comprising:

a cylinder having an interior cylindrical surface composed of a first material having a first conductivity;

a second material circumscribing said first material and forming a body about said first cylinder and composed of a second material having a thermal conductivity greater than the conductivity of said first material;

a refrigerant path extending through said second material with means to effect an increase in the surface area of said second material exposed to said refrigerant in said path, said first material comprising a thin layer of plated metal disposed upon the interior surface of said second material.

* * * * *